(12) United States Patent
Kerr

(10) Patent No.: US 6,918,726 B1
(45) Date of Patent: Jul. 19, 2005

(54) LOCK NUT HAVING RING LOCK WITH LUG

(75) Inventor: Jack R. Kerr, Desoto, TX (US)

(73) Assignee: Loc-Mor, Inc., Mansfield, TX (US)

( * ) Notice: Subject to any disclaimer, the term of this patent is extended or adjusted under 35 U.S.C. 154(b) by 0 days.

(21) Appl. No.: 10/757,759

(22) Filed: Jan. 14, 2004

(51) Int. Cl.$^7$ .............................................. F16B 39/34
(52) U.S. Cl. ...................................... 411/303; 411/247
(58) Field of Search ........................ 411/302, 303, 304, 411/432, 246–249

(56) References Cited

U.S. PATENT DOCUMENTS

| 248,975 | A | * | 11/1881 | Wootten ..................... 411/303 |
| 275,898 | A | | 4/1883 | Ford |
| 1,010,109 | A | | 11/1911 | Badger |
| 1,432,050 | A | | 10/1922 | Broderick |
| 1,986,891 | A | | 1/1935 | Green |
| 2,325,303 | A | | 7/1943 | Brooke |
| 2,399,639 | A | | 5/1946 | Kelly |
| 2,454,443 | A | | 11/1948 | Giles |
| 2,509,647 | A | | 5/1950 | Lipscomb |
| 3,040,796 | A | * | 6/1962 | Gouverneur, II ............ 411/303 |
| 3,203,459 | A | * | 8/1965 | Coldren .................. 411/303 X |
| 4,692,077 | A | | 9/1987 | Kerr et al. .................. 411/206 |

* cited by examiner

*Primary Examiner*—Flemming Saether
(74) *Attorney, Agent, or Firm*—Michael L. Diaz

(57) ABSTRACT

A lock nut having a locking ring with a spoon-shaped lug. The lock ring includes a nut body having a bore with an interior threaded portion and a substantially cylindrical recess coaxial with the threaded portion of the bore. The recess includes a single notch on a portion of the recess. In addition, the lock ring includes a threaded locking ring positioned within the recess. The locking ring is deformed when threading the bolt onto the lock nut to frictionally grip the bolt. The locking ring also includes a single projecting lug at one side only of the locking ring, which fits into the notch to prevent relative rotation between the ring and the nut body. The lug includes a bowl-shaped nodule for collecting shavings gathering within the threads of the bolt and the interior bore of the lock nut.

9 Claims, 2 Drawing Sheets

LOCK NUT HAVING RING LOCK WITH LUG

BACKGROUND OF THE INVENTION

1. Technical Field of the Invention

This invention relates to lock nuts, and more particularly, to a lock nut having a ring lock with a bowl-shaped lug.

2. Description of Related Art

The use of fastening nuts upon threaded bolts is well known and have been used for many years. The nut fasteners are subjected to various dynamic loads, vibrations, shock and stress reversals which ultimately makes the fastening nuts susceptible to loosening. The nut fastener is often tightened to high pre-load levels, which significantly reduces the chance of nut loosening. However, in many circumstances (e.g., joint makeup between the bolt and nut), a pre-load is simply inadequate to prevent the fastening nut from loosening. Therefore, many manufacturers utilize other anti-loosening measures to counter this problem. Once such measure is the use of lock-type fasteners.

Typically, lock type fasteners are seated upon a bolt where resistence to loosening is gained through the use of an accessory device or through the development of a tensile load as a result of the tightening of the lock type fastener upon the bolt. In other types of fasteners, fasteners develop a frictional interference between the external threads of the bolt and the internal threads of the fastener.

In any case, the fasteners often include an inner lock ring seated within a recessing inner area of the bore of the fastener. One such lock ring is disclosed in U.S. Pat. No. 2,509,647 to Lipscomb. FIG. 1 illustrates a top plan view of an existing lock nut having a nut body 10 with a hexagonally shaped exterior and a threaded cylindrical bore 11. FIG. 2 is a plan view of a locking ring 14 removed from the lock nut of FIG. 1. At the upper end of the nut body is formed a cylindrical recess 12 coaxially with the bore 11 and formed with smooth interior walls having a peripheral notch 13 extending through the axial length of the recess.

The recess is sized and shaped to receive a locking ring 14 which is interiorly threaded with threads forming a continuation of the threads in the bore 11. Thus, when a nut is threaded through the bore 11, the bolt is continually thread into the ring 14. The ring is initially formed in a generally oval shape with its major axis as indicated at 15 in FIG. 2 and its minor axis at 16. When in its original form, the major axis 15 of the ring is slightly in excess of the diameter of the recess 12. The oval shape is created by applying pressure along two points of the exterior portion of the ring.

When the ring is seated within the recess, its major axis is squeezed in slightly so that when it is in position in the recess, the ring tends to expand against the sides of the recess to hold the ring in place. In addition, it should be noted that the ring, while in its original form, has an interior diameter of the ring along its minor axis which is slightly shorter than the diameter of a bolt on which the ring is to be threaded, resulting in the ring frictionally gripping the bolt. This gripping by the ring of the bolt causes a resistance to rotation of the nut on the bolt.

The ring is held against the relative rotation of the nut body (during rotation of the nut body), by a projecting lug 17. The projecting lug is formed at one side of the ring and sized and shaped to fit into the notch 13. The lug is typically located between the ends of the major and minor axes of the ring. The lug is displaced from the minor axis in the same direction in which the ring is turned to unscrew it from the bolt, indicated by arrow 18 in FIG. 2.

When utilizing the existing lock nut, the nut body 10 is positioned on a threaded bolt (not shown) and rotated to draw the lock nut onto the threads on the bolt. As the end of the bolt reaches the upper end of the threaded bore 11, the bolt starts to thread into the ring 14, causing the ring to expand slightly along the minor axis so that the ring frictionally grips the bolt. The engagement of the lug with the notch prevents turning of the ring in the recess during the rotation of the nut upon the bolt.

Although existing lock nuts as discussed in FIGS. 1 and 2 have effectively provided a resistance for a nut from rotating off a bolt on which it is seated, there are several problems. Existing interference fit nuts often leave shavings from the threads of the bolt or the threaded bore of the nut. These shavings can cause galling, or heating of the threaded portions of the bolt. When being turned, the bolt may heat up, causing expansion of the bolt and increasing measured torque upon the rotating nut. An operator utilizing the lock nut typically measures the torque applied to the nut to ascertain the correct tightness of the nut upon the bolt. If a gall is generated within the interaction between the threaded bolt and the threaded bore of the nut, gall torque may be mistakenly identified by the operated as the appropriate locking torque. This misidentification of torque may result in improperly tightened nuts upon bolts.

In addition to the problems of galling, the configuration of the lock ring has some inherent problems. Specifically, the existing locking ring is manufactured by applying a force to two sides, or "hit" on two sides of the locking ring. The locking ring thus forms an oval shape whereby the minor and major axis of the locking ring are deformed to create an interference. However, since the oval shape is supported in its undistorted form by two sides, the ring often does not return to its original state after being deformed.

Review of the existing art reveals no disclosure or suggestion of an apparatus as that described and claimed herein. Thus, it would be a distinct advantage to have a locking nut which is not susceptible to galling and more resilient to returning to its original form after distortion. It is an object of the present invention to provide such an apparatus.

SUMMARY OF THE INVENTION

In one aspect, the present invention is a lock nut. The lock nut includes a nut body having a bore with an interior threaded portion and a substantially cylindrical recess coaxial with the threaded portion of the bore. The recess has a single notch on a portion of the recess. The lock nut also includes a threaded locking ring positioned within the recess. The locking ring is deformable for frictionally gripping a bolt on which the lock nut is to be threaded. A single lug projects out from one side of the locking ring and fits into the notch to prevent relative rotation between the ring and the nut body. The lug has a bowl-shaped nodule.

In another aspect, the present invention is a locking ring for use with a lock nut having a bore with an interior threaded portion and a cylindrical recess coaxial position within the threaded portion of the bore. The recess of the lock nut has a single notch. The locking ring includes a threaded locking ring positioned within the recess. The locking ring is deformable when threaded onto a bolt on which the lock nut is to be threaded. The locking ring can then frictionally grip the bolt when the bolt is threaded onto the lock nut. The locking ring also includes a single projecting lug at one side only of the locking ring which fits into the notch to prevent relative rotation between the ring and the nut body. The lug has a bowl-shaped nodule.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
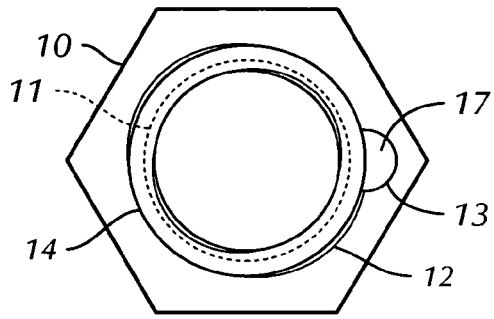
FIG. 1 (Prior Art) illustrates a top plan view of a lock nut having a nut body with a hexagonally shaped exterior and a threaded cylindrical bore.
Figure 2:
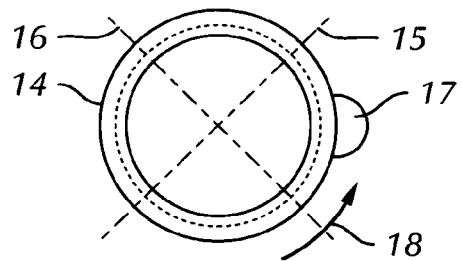
FIG. 2 (Prior Art) is a plan view of a locking ring removed from the lock nut of FIG. 1.
Figure 3:
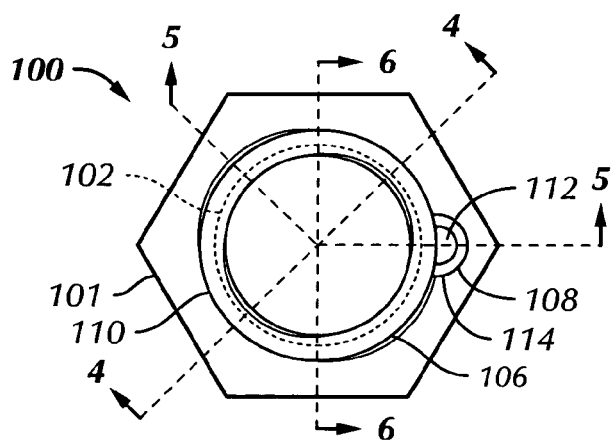
FIG. 3 illustrates a top plan view of a lock nut having a nut body in the preferred embodiment of the present invention.
Figure 7:
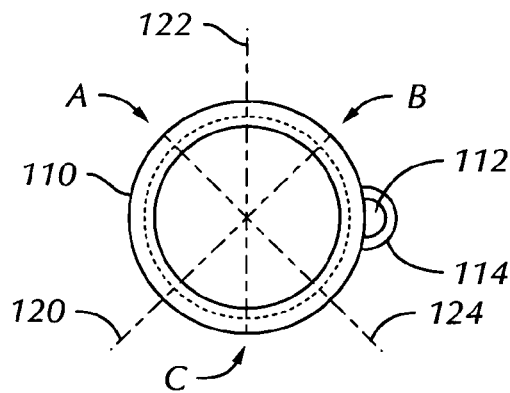
FIG. 7 is a plan view of the locking ring removed from the lock nut of FIG. 3.
Figure 4:
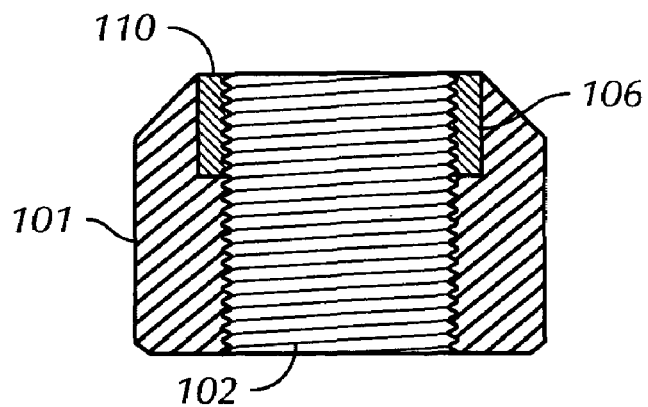
FIG. 4 is a cross sectional view of the lock nut of FIG. 3 along line 4—4.
Figure 5:
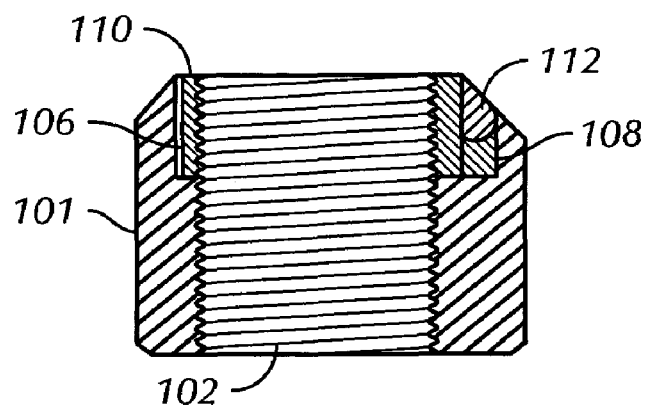
FIG. 5 is a cross sectional view of the lock nut of FIG. 3 along line 5—5.
Figure 6:
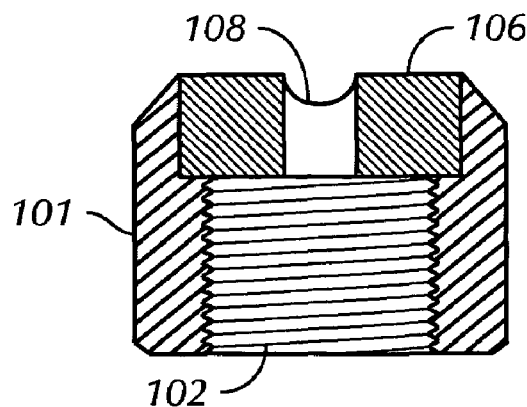
FIG. 6 is a cross sectional view of the lock nut of FIG. 3 along line 6—6.

A lock nut having an improved ring lock with a bowl-shaped lug is disclosed. FIG. 3 illustrates a top plan view of a lock nut 100 having a nut body 101 in the preferred embodiment of the present invention. The nut body typically has a hexagonally-shaped exterior body. However, the nut body may be any shape. The nut body also includes a threaded cylindrical bore 102. FIGS. 4, 5, and 6 are sections of lines 4—4, 5—5, and 6—6 of the lock nut 100 of FIG. 3. In addition, FIG. 7 is a plan view of a locking ring 110 removed from the lock nut 100 of FIG. 3. The lock nut may be composed of any material, preferably a hardened steel.

A cylindrical recess 106 is coaxially located with the bore 102. The recess includes smooth interior walls with a peripheral notch 108 which extends through the axial length of the recess. The recess is sized and shaped to receive a locking ring 110. The locking ring includes threads forming a continuation of the threads in the bore 102. When a nut is threaded through the bore 102, the bolt is continually thread into the locking ring 110. Although the locking ring may take any shape which may accommodate a bolt and nut, in the preferred embodiment of the present invention, the locking ring is initially formed in a generally triangular/oval shape. When in its original form, there are three axes 120, 122 and 124. In its original form, each axis perpendicularly bisects an opposing side, as illustrated in FIG. 7. The generally triangular/oval shape are preferably manufactured by applying force along three points of the exterior portion of the locking ring, illustrated as A, B, and C.

When the locking ring 110 is seated within the recess 106, each axis is squeezed in slightly so that when it is in place in the recess, the locking ring tends to expand against the sides of the recess to hold the locking ring in place. In a similar manner as discussed for the locking ring 14 of FIG. 3, the locking ring 110 frictionally grips the bolt to resist rotation of the nut on the bolt. The locking ring 110 is held against the relative rotation of the nut body (during rotation of the nut body), by a projecting lug 112. The projecting lug is formed at one side of the ring and sized and shaped to fit into the peripheral notch 108. The lug is bowl-shaped having a hollowed out indentation 114 within the projecting lug.

With reference to FIGS. 3–7, the operation of the lock nut 100 will now be explained. The nut body 101 is positioned on a threaded bolt (not shown) and rotated to draw the lock nut onto the threads on the bolt. As the end of the bolt reaches the upper end of the threaded bore 102, the bolt starts to thread into the locking ring 110, causing the locking to expand slightly so that the ring frictionally grips the bolt. The engagement of the lug with the notch prevents turning of the locking ring in the recess 106 during the rotation of the nut upon the bolt.

While rotating the lock nut 100 onto the bolt, there is a tendency for shavings from the threads of the bolt or bore to be released. The indentation 114 may collect the shavings within the indentation 114, thus preventing the shavings from remaining on the threads. Since the shavings may be collected within the indentation, galling is reduced.

The present invention provides several advantages over existing lock nuts. The lock nut 100 prevents galling by providing a location for shavings from the threads of a bolt and bore to be collected in a location separate from the threads. In addition, since the locking ring is shaped in a triangular/oval shape, the locking ring more easily reverts to its original shape. The locking ring is biased into its original position by three supports forming the three sides of the locking ring, rather than the two supports utilized in existing locking rings. With two sides merely providing an outwardly biased force, the original shape is not as easily maintained as with three sides.

It is thus believed that the operation and construction of the present invention will be apparent from the foregoing description. While the apparatus shown and described has been characterized as being preferred, it will be readily apparent that various changes and modifications could be made therein without departing from the scope of the invention as defined in the following claims.

What is claimed is:

1. A lock nut, said lock nut comprising:
   a nut body having a bore with an interior threaded portion and a substantially cylindrical recess coaxial with the threaded portion of the bore, the recess having a single notch on a portion of the recess;
   a threaded locking ring positioned within the recess, the locking ring having deforming means for frictionally gripping a bolt on which the lock nut is to be threaded; and
   a single projecting lug at one side of the locking ring fitting into the notch to prevent relative rotation between the ring and the nut body, the lug having a bowl-shaped nodule with a hollowed-out indentation.

2. The lock nut of claim 1 wherein the locking ring is deformable from an original shape and whereby the locking ring frictionally grips the bolt while being threaded onto the bolt.

3. The lock nut of claim 2 wherein the locking ring is biased to a slightly triangular shape which is deformed to an oval shape when the locking ring is threaded on the bolt.

4. The lock nut of claim 1 wherein the hollowed-out indentation includes an area where shaving residuals found within the threaded portion of the bore may collect, the shaving residuals falling into the indentation when the nut body is twisted upon the bolt.

5. The lock nut of claim 1 wherein the lock nut is composed of a steel material.

6. A locking ring for use with a lock nut having a bore with an interior threaded portion and a cylindrical recess coaxial positioned within the threaded portion of the bore, the recess having a single notch on a portion of the recess, the locking ring comprising:
- a threaded locking ring positioned within the recess, the locking ring being deformable when threaded onto a bolt on which the lock nut is to be threaded, the locking ring frictionally gripping the bolt when the bolt is threaded onto the lock nut; and
- a single protecting lug at one side of the locking ring fitting into the notch to prevent relative rotation between the ring and the nut body, the lug having a bowl-shaped nodule with a hollowed-out indentation.

7. The locking ring of claim 6 wherein the locking ring is deformable from an original shape and whereby while the locking ring is threaded on the bolt, the lock ring frictionally grips the bolt.

8. The lock nut of claim 7 wherein the locking ring is biased to a slightly triangular shape which is deformed to an oval shape when the locking ring is threaded on the bolt.

9. The lock nut of claim 6 wherein the lock nut is composed of a steel material.

* * * * *